United States Patent
Ueno et al.

(10) Patent No.: US 6,532,824 B1
(45) Date of Patent: Mar. 18, 2003

(54) CAPACITIVE STRAIN SENSOR AND METHOD FOR USING THE SAME

(75) Inventors: Toru Ueno, Sendai (JP); Kazuya Mori, Sendai (JP); Tetsuo Yoshida, Sendai (JP)

(73) Assignee: Tokin Corporation, Miyagi (JP)

( * ) Notice: Subject to any disclaimer, the term of this patent is extended or adjusted under 35 U.S.C. 154(b) by 0 days.

(21) Appl. No.: 09/786,944

(22) PCT Filed: Jul. 7, 2000

(86) PCT No.: PCT/JP00/04538

§ 371 (c)(1),
(2), (4) Date: Mar. 8, 2001

(87) PCT Pub. No.: WO01/04593

PCT Pub. Date: Jul. 7, 2000

(30) Foreign Application Priority Data

| Jul. 9, 1999 | (JP) | 11-196003 |
| Sep. 2, 1999 | (JP) | 11-248516 |
| Sep. 2, 1999 | (JP) | 11-248876 |
| Sep. 14, 1999 | (JP) | 11-260218 |
| Sep. 16, 1999 | (JP) | 11-261823 |

(51) Int. Cl.[7] .................................................. G01B 7/16
(52) U.S. Cl. ............................................................. 73/780
(58) Field of Search .............................. 73/780, 767, 768, 73/862.337, 862.046, 862.636

(56) References Cited

U.S. PATENT DOCUMENTS

| 3,894,251 A | * | 7/1975 | Shibayama et al. | 310/313 C |
| 4,188,651 A | * | 2/1980 | Dornfeld et al. | 361/303 |
| 4,422,127 A | * | 12/1983 | Lavene | 361/323 |
| 4,941,363 A | | 7/1990 | Doemens et al. | |
| 5,233,213 A | | 8/1993 | Marek | |
| 5,394,096 A | * | 2/1995 | Meyer | 324/662 |
| 5,608,246 A | * | 3/1997 | Yeager et al. | 235/492 |
| 5,610,528 A | | 3/1997 | Neely et al. | |
| 5,723,353 A | | 3/1998 | Muenzel et al. | |
| 5,750,904 A | | 5/1998 | Doemens et al. | |
| 5,804,065 A | * | 9/1998 | Kolz | 134/1 |
| 5,827,980 A | | 10/1998 | Doemens et al. | |
| 6,222,376 B1 | * | 4/2001 | Tenney, III | 324/663 |

FOREIGN PATENT DOCUMENTS

| JP | 58-37799 | 3/1983 |
| JP | 59-54904 | 3/1984 |
| JP | 59-151029 | 8/1984 |
| JP | 63-171334 | 7/1988 |
| JP | 9-113385 | 5/1997 |

* cited by examiner

Primary Examiner—Max Noori
(74) Attorney, Agent, or Firm—Frishauf, Holtz, Goodman & Chick, P.C.

(57) ABSTRACT

A capacitive strain sensor comprises a substrate (119) and a pair of interdigital electrode capacitors (209, 209A) formed on the substrate. A dielectric thick film (129) having a uniform thickness and made of a material the dielectric constant of which varies with strain is provided on an elastic body having a flat or curved surface on the substrate (119). A block (318) for preventing strain from being produced is secured to one end of the substrate (119); a weight (329) is secured to the other end. The capacitors (209, 209A) are formed by interdigitally arranging a pair of electrodes being parallel linear electrodes of linear conductors on the substrate.

10 Claims, 10 Drawing Sheets

PRIOR ART

Vy: APPLIED VOLTAGE TO Y

Vx: PRODUCED VOLTAGE AT X

Vz: APPLIED VOLTAGE AT Z

CAPACITIVE STRAIN SENSOR AND METHOD FOR USING THE SAME

This application is a U.S. National Phase Application under 35 USC 371 of International Application PCT/JP00/04538 (not published in English) filed Jul. 7, 2000.

TECHNICAL FIELD

This invention relates to a strain sensor formed on a surface of an elastic body for detecting strain produced due to bending of the elastic body and, in particular, to a capacitive strain sensor for detecting the produced strain as a change in capacitance, to a method of using the same for detecting an internal pressure of a hollow-cylindrical closed container made of the above-mentioned elastic body with reference to expansion/depression in its upper flat end portion, for detecting cylinder torsion produced on an outer peripheral surface of a bar-like cylindrical elastic body, and for detecting an acceleration, and to a method of detecting the strain and correcting the same.

BACKGROUND ART

As a strain sensor formed on a surface of an elastic body for detecting strain produced due to bending of the elastic body, there has been well known a so-called strain gauge having an electric resistance changing in value in response to the strain.

FIG. 1 is a perspective view showing an example of the state of use of a conventional strain sensor. FIG. 2 is a perspective view showing an example of a strain gauge used as the conventional strain sensor.

In FIG. 1, a cylindrical elastic body 20 is placed on one surface of a mount table 10 with a strain gauge 30A adhered to a center area of an upper end surface 21 of the elastic body 20 and a strain gauge 30B adhered to an outer peripheral side surface 22 so that its strain detection axis is inclined by 45° with respect to a center axis direction of the elastic body 20 to coincide with a strain direction.

The strain gauge 30 shown in FIG. 2 is one identical with the strain gauges 30A and 30B shown in FIG. 1 and comprises a resistance wire 31 having a parallel-line thin film pattern made of an Fe—Ni alloy and formed by making a plurality of turns, and terminals 32 and 33 arranged at opposite ends thereof.

At first, the strain sensor 30A shown in FIG. 1 will be described in connection with the case where the cylindrical elastic body 20 is a closed container and the strain sensor is used in detecting an internal pressure of the closed container elastic body 20.

When the internal pressure of the closed container elastic body 20 is increased from a normal condition, the closed container elastic body 20 is deformed and expands in the upper end surface 21, the outer peripheral side surface 22 and a lower end surface thereof. When the internal pressure of the closed container elastic body 20 is decreased from the normal condition, the elastic body 20 is deformed and is depressed in the upper end surface 21, the peripheral side surface 22 and the lower end surface thereof. Accordingly, if the wall thickness of the upper end 21 with the strain gauge 30A adhered thereonto is slightly reduced within a safety range as compared with those of the peripheral side and the bottom end, the variation in internal pressure can be converged to the deformation of the upper end 21.

The strain gauge 30 shown in FIG. 2 is a sensor in which a resistance value of a conductor formed in the thin film pattern changes under the strain applied thereto. When the internal pressure of the closed container elastic body 20 shown in FIG. 1 is varied, the upper end 21 is at first deformed so that the strain gauge 30A adhered thereto is similarly deformed. This results in variation in electrical resistance between the both terminals 32 and 33 of the resistance wire 31 of the strain gauge 30. Thus, it is possible to detect the internal pressure of the closed container made of the elastic body 20.

Next, the strain sensor 30B shown in FIG. 1 will be described in connection with the case where the elastic body 20 having a cylindrical shape, that is, the cylindrical elastic body 20 is a cylinder having a circular-shaped cross section in the outer peripheral surface and the strain sensor is used in detecting torsion of the cylinder.

In the above-mentioned state, it is assumed that the torsional strain of the cylindrical elastic body 20 is detected by the use of the strain gauge 30B. When a torsional moment is applied to the cylindrical elastic body 20 to produce the torsional strain in the cylindrical elastic body 20, an extension strain in a direction inclined by 45° with respect to the center axis direction of the cylindrical elastic body 20 and a compressive strain in a direction perpendicular thereto are produced at the portion where the strain gauge 30 is adhered. Therefore, it is possible to detect the torsional strain of the cylindrical elastic body 20 by detecting the change in resistance value depending on the extension strain and the compressive strain.

On the other hand, the strain sensor can be used as an acceleration sensor. The acceleration sensor is used in detecting the vibration of a car and the acceleration upon collision thereof, the vibration and the acceleration applied to an electronic apparatus when it is carried, and the abnormal vibration of a motor and various kinds of machines. In order to detect the vibration and the impact of those machines, many kinds of acceleration sensors have been used. Depending on the magnitude and a frequency range of the acceleration to be detected, use has been made of a selected one of the acceleration sensors which is suitable for the application.

Next, referring to FIGS. 3 to 5, description will be made about a conventional acceleration sensor which is used, for example, in detecting the vibration caused by knocking of a car engine or the vibration of a machine.

An acceleration sensor 40 shown in FIG. 3 has a structure in which two piezoelectric rings 41 and 42 are stacked so that their polarization directions are opposite to each other and are fixed by a fixing screw 44 together with a weight 43 comprising a hollow metal cylinder, and is used in detecting the acceleration of the order of several Gal to several tens of Gal. The acceleration sensor 40 is provided with a case 45 generally connected to the ground, specifically, connected via a mounting screw 47 to a ground terminal of an object to be detected, together with a terminal 46 similarly grounded.

In the acceleration sensor 40 of FIG. 3, when an acceleration $\alpha_4$ is applied from the outside, the piezoelectric rings 41 and 42 are subjected to the force "$F_4 = M_4 \alpha_4$". Herein, $M_4$ represents the mass of the weight 43. Each of the piezoelectric rings 41 and 42 is an element which produces an electric voltage under a pressure applied thereto, as is self-explanatory, and produces the electric voltage given by "$V = k \cdot g \cdot F_4$". Herein, "k" and "g" represent a constant determined by the shape and the size of the acceleration sensor and another constant determined by a piezoelectric material, respectively. Thus, the principle of an operation of a piezoelectric-type acceleration sensor represented by the acceleration sensor 40 shown in FIG. 3 is that an applied acceleration acts on the weight 43 to produce a force and the piezoelectric rings 41 and 42 are deformed under the force to produce the electric voltage.

Recently, development has been made of a capacitive acceleration sensor of a so-called micromachine type produced by making the most of a semiconductor micromachining technique. This sensor can detect the acceleration on a d.c. basis and can accommodate a wide range from a small acceleration not greater than 1 Gal to a large acceleration of several tens of Gal upon collision of the car by designing a resonant frequency of a mechanical vibration system and a mechanical strength of each part to meet such a requirement.

FIG. 4 is a schematic perspective view showing an example of a structure of a capacitive acceleration sensor 50 using the micromachining technique. The capacitive acceleration sensor 50 comprises an Si single crystal plate 51 which is formed, by a surface micromachining technique, with movable electrodes 55(X) integral with a movable plate 54 which serves as a weight and which is supported by supporting portions 53 fixed to anchors 52, and two sets of fixed electrodes 56(Y) and 57(Z) faced to the movable electrodes 55(X) to establish the capacitances.

Next, referring to FIG. 5 in addition to FIG. 4, description will be made about the principle of detecting the acceleration. FIG. 5 is a view for describing an operation of the capacitive acceleration sensor 50 shown in FIG. 4.

In FIG. 5, X(55) electrodes, Y(56) electrodes, and Z(57) electrodes are connected in common, respectively, which can resultantly be considered as a circuit comprising two capacitors connected in series where the electrode X(55) is disposed between the electrodes Y(56) and Z(57) faced to each other as illustrated in FIG. 5. In FIG. 4, the direction of the detected acceleration is a direction perpendicular to a longitudinal direction of each of the electrodes X, Y, and Z and parallel to a plane of the Si single crystal plate 51. Accordingly, when an acceleration $\alpha_5$ is applied, the force "$F_5=M_5\alpha_5$" is produced, like in the case of the piezoelectric-type acceleration sensor. In this case, the mass $M_5$ represents the mass of the movable plate 54 including the movable electrodes 55(X). When the force $F_5$ is produced, the movable electrodes 55(X) are displaced to positions where the balance is established with elastic force of the supporting portions 53 fixed to the anchors 52. Specifically, in FIG. 4, the movable electrodes 55(X) are shifted from the center position towards the fixed electrode 56(Y) or 57(Z).

In FIG. 4, it is assumed that the fixed electrodes 56(Y) and the fixed electrodes 57(Z) are applied with electric voltages Vy and Vz different in phase by 180° from each other and equal in amplitude, respectively. In this event, when the movable electrodes X(55) are positioned at the center between the fixed electrode 56(Y) and the fixed electrode 57(Z), an electric voltage Vx of the movable electrode X(55) is equal to zero because of mutual cancellation. On the other hand, when the acceleration is applied so that the movable electrode X(55) is shifted from the center between the fixed electrode Y(56) and the fixed electrode Z(57), the electric voltage Vx is produced at the movable electrode X(55). The level of the electric voltage is proportional to the displacement of the movable electrode X(55), that is, the magnitude of the applied acceleration. Accordingly, it is possible to detect the applied acceleration from the electric voltage at the movable electrode X(55).

However, in the above-mentioned strain gauge, a metal thin film having resistance changing in response to the strain applied thereto is formed on a thin substrate, such as polyimide, by means of vapor deposition or the like. In actual detection of strain, the thin substrate such as polymide must be adhered by the use of an adhesive to a plate to be subjected to detection of the strain. Since a detection characteristic will vary depending upon an adhering position or the fluctuation in thickness of an adhesive layer, the characteristic must be confirmed upon each adhesion.

As another means for detecting the deformation of a flat plate, there is a method where, providing that the flat plate is a metallic plate which is subjected to a deformation to be detected, another metal plate is disposed to face the above-mentioned metallic plate to detect, as the change in capacitance between two electrodes, the change in spacing between the metal plates facing each other in response to the deformation of the metallic plate to be detected. In this method, however, it is necessary to accurately hold the positional relationship between the metallic plate to be detected and the other metal plate separately arranged. Therefore, the structure is complicated, resulting in difficulty in manufacturing.

In case of a torsion sensor on a cylindrical side surface, it is further necessary to adjust an inclination angle with respect to an axial direction. In principle, the resistance value varies depending on the change in tensile strain and compressive strain. Therefore, if signal processing is carried out by the use of a microcomputer or the like, an analog-to-digital conversion circuit is required. As a result, a signal processing circuit is complicated.

The strain gauge using a semiconductor is advantageous as the strain sensor because the sensitivity is as high as several ten times because of a piezo resistive effect, as compared with the strain gauge using the metal. However, the strain gauge using the semiconductor is disadvantageous in that the temperature-dependent change in resistance is large and the strain sensitivity varies with the strain level. Accordingly, if a small strain is measured, the structure becomes complicated.

The piezoelectric type acceleration sensor described with reference to FIG. 3 is advantageous in that its structure is simple and no power supply is necessary in principle. However, in the state where an acceleration on a d.c. basis, that is, a constant force is applied to a piezoelectric element, electric charges produced by the deformation leak out through an electronic circuit for detection and a surface or an interior of a piezoelectric material so that the electric voltage is reduced. Consequently, it is difficult to correctly detect the applied acceleration.

In the capacitive acceleration sensor described with reference to FIGS. 4 and 5, the movable electrode and the fixed electrode are required in order to establish the capacitance. The applied acceleration is at first converted into the change in spacing between the movable electrode and the fixed electrode and, as a result, converted into the change in capacitance. Accordingly, in order to accurately form the movable electrode and the fixed electrode, an expensive equipment capable of achieving a high working accuracy is required. Thus, this acceleration sensor is unfavorable.

Therefore, it is an object of this invention to provide a strain sensor which is simple in structure and stable in characteristic, which can accurately detect very small strain, and which can carry out correction not only for the temperature but also for other environmental factor such as the humidity. It is a further object to provide a strain sensor which has an advantage of a capacitive acceleration sensor capable of detecting an acceleration on a d.c. basis and which can be used as an acceleration sensor capable of detecting the change in capacitance responsive to deformation of an elastic body when the acceleration is applied, without using two electrodes, that is, a movable electrode and a fixed electrode, but using a single element.

DISCLOSURE OF THE INVENTION

A capacitive strain sensor according to this invention comprises a substrate and at least one interdigital pair-electrode capacitor formed thereon. The substrate is an elastic member having a flat or a curved surface on which a dielectric film layer is formed with a substantially uniform thickness and made of a material having a dielectric constant changing in dependence upon the strain. The interdigital pair-electrode capacitor comprises at least a pair of electrodes which are formed on a surface of the substrate as parallel linear electrodes comprising a plurality of linear conductors and which are combined in an interdigital pattern.

In a method of using the above-mentioned capacitive strain sensor, provision is made of oscillation means for generating frequency modulation depending on the change in capacitance of the capacitive strain sensor so that a strain level is detected from fluctuation in frequency of an oscillation signal produced by the oscillation means. Specifically, the capacitive strain sensor is incorporated as a capacitor element in the oscillator circuit so that the magnitude of the strain responsive to the deformation of the elastic body can be converted into the change in capacitance or impedance and, furthermore, can readily be converted into the change in frequency. Since a very small change can be extracted in the frequency after conversion, it is possible to easily and reliably detect even a slight change in strain.

In the above-mentioned capacitive strain sensor, use of a single interdigital pair-electrode capacitor limits a direction to be able to be detected thereby. By the use of two interdigital pair-electrode capacitors arranged so that the directions of digits in the interdigital patterns formed by the linear electrodes are substantially perpendicular to each other, it is possible to remove the limitation in directivity of the strain sensor itself. Furthermore, the capacitive strain sensor may have a structure in which a plate-like elastic body is a flat plate having a disk shape or a polygonal shape including a square and the interdigital pair-electrode capacitor is formed so that the linear electrodes as the digits of the fingers of the interdigital pattern are arranged in substantially concentric circles around the center of the flat plate. With this structure, radial strain can reliably be detected.

If the interdigital pair-electrode capacitors are formed on upper and lower ends of a cylindrical closed container comprising the elastic body, the capacitive strain sensor is effectively used in detecting the change in internal pressure of the closed container by detecting the strain of the ends as the change in capacitance of the capacitors.

The capacitive strain sensor according to this invention may be one wherein the elastic body is formed in a rectangular structure and the interdigital pair-electrode capacitor comprises linear conductors and has a capacitance by forming a pair of electrode patterns including a pair of common electrodes extending in parallel to two parallel sides of the rectangular elastic body and faced to each other and a plurality of linear electrodes inclined by about 45° with respect to an extending direction of the common electrodes and extending in parallel to one another to be alternately interposed as the digits of the interdigital pattern. The above-mentioned electrode patterns are suitable for a cylindrical structure in which the elastic body extends in one axis direction as a center axis and has an outer peripheral surface having a circular section. Specifically, the dielectric film layer is formed on the outer peripheral surface of the cylindrical structure to be substantially uniform in thickness. The interdigital pair-electrode capacitor has a capacitance by forming a pair of electrode patterns including a pair of common electrodes forming ring patterns around an outer peripheral surface of the cylindrical structure and faced to each other and a plurality of linear electrodes inclined by about 45° with respect to the center axis direction and spirally extending from the common electrodes in parallel to one another to be alternately interposed as the digits of the interdigital pattern.

If two equal parts divided in a center axis direction or in a direction parallel to the center axis are formed on an outer peripheral side surface of the cylindrical structure comprising the elastic body and the directions of the linear electrodes as the digits in two groups are perpendicular to each other, the above-mentioned capacitive strain sensor is effective in detecting the strain for torsion in both directions.

The capacitive strain sensor according to this invention may be one wherein the elastic body has a flat plate shape and is provided with a fixed portion formed on one end thereof and having a structure for preventing production of the strain and that a single interdigital pair-electrode capacitor is formed on the surface of the elastic body except the fixed portion. Preferably, the capacitive strain sensor further comprises a weight formed on the surface of the elastic body except the fixed portion of the elastic body to promote the bending of the elastic body. By adding the weight, it is possible to effectively detect an applied acceleration.

The above-mentioned capacitive strain sensor has a simple structure and can form an LC oscillator circuit or an RC oscillator circuit. The change in output frequency of the oscillator circuit depending on the change in capacitance is very effective in accurately and exactly detecting a small strain level by voltage conversion.

However, since the capacitance of the capacitive strain sensor varies not only following the change in strain level but also following the change in ambient temperature, a correction circuit is required to correct the change in characteristic of the capacitance depending upon the temperature.

For this purpose, in the capacitive strain sensor according to this invention, at least one of an interdigital pair-electrode capacitor arranged as a reference or a separately arranged capacitor is provided as a reference capacitor. The capacitance of the reference capacitor is used for correction in strain detection. The elastic body with one interdigital pair-electrode capacitor formed thereon is provided with a fixed portion formed on one end thereof and having a thickness such that the strain is hardly produced or having a fixed structure for preventing production of the strain. The reference capacitor including the reference interdigital pair-electrode capacitor is formed on the fixed portion. Accordingly, even if the strain is produced in the elastic body, the reference capacitance is unchanged. Of course, the reference capacitor may be formed on a fixed body separate from the elastic body.

By comparing the capacitance or impedance of the above-mentioned reference capacitor with that of the interdigital pair-electrode capacitor for detecting the strain and by carrying out correction, it is possible to eliminate external conditions affecting the interdigital pair-electrode capacitor except the strain.

BEST MODE FOR EMBODYING THE INVENTION

Description will be made about this invention with reference to the drawings in order to describe this invention in detail.

A capacitive strain sensor according to this invention comprises a thick or thin dielectric film layer having a substantially uniform thickness, made of a material having a dielectric constant changing in dependence upon the strain, and formed as a substrate on a flat surface or a curved surface of a plate-like or a bar-like elastic body, and parallel linear electrodes comprising a plurality of linear conductors formed on its surface to form at least one interdigital pair-electrode capacitor.

Figure 6:
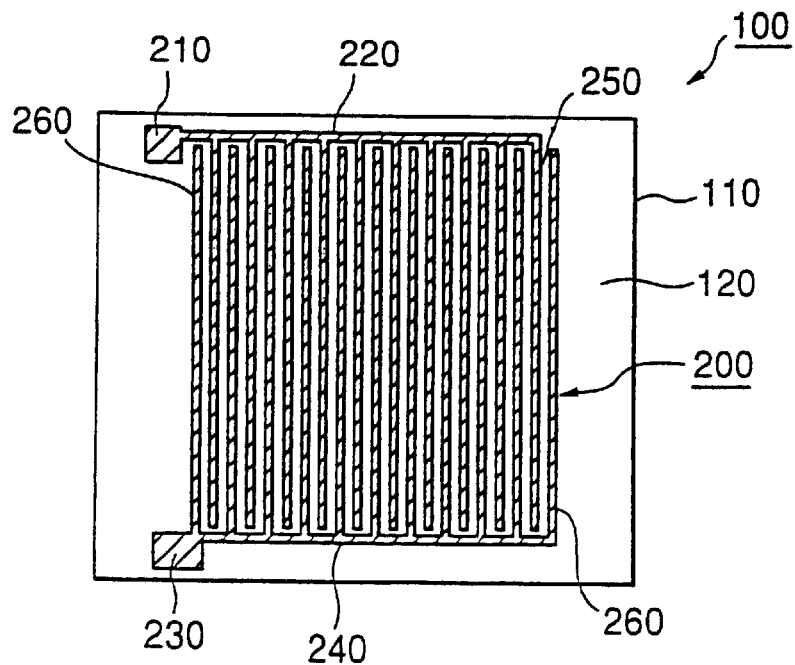
FIG. 6 is a plan view of an electrode pattern for describing the principle of strain detection by the use of a flat-plate capacitive strain sensor including an interdigital pair-electrode capacitor.

Referring to FIG. 6, description will at first be made about an interdigital pair-electrode capacitor 200 having a capacitance in a flat-plate capacitive strain sensor 100.

As electrodes of the interdigital pair-electrode capacitor 200 in the flat-plate capacitive strain sensor 100, a pair of comb-shaped electrode patterns are formed by linear conductors on a dielectric film layer 120 formed on a surface of a rectangular flat-plate insulating sheet 110.

The pair of electrode patterns comprise a linear common electrode 220 arranged to extend in parallel with and near to one of opposite long sides of the rectangular flat-plate insulating sheet 110 and having one end connected to a terminal 210, and another linear common electrode 240 arranged to extend in parallel with and near to the other of the opposite long sides of the insulating sheet 110 and having one end connected to a terminal 230. The linear common electrode 220 is provided with a plurality of linear electrodes 250 extending in a direction perpendicular to the extending direction thereof and the linear common electrode 240 is similarly provided with a plurality of linear electrodes 260 extending in a direction perpendicular to the extending direction thereof. These linear electrodes are arranged in parallel to be alternately interposed, respectively. Specifically, the linear electrodes 250 and 260 are alternately arranged at a predetermined spacing from one another to extend in parallel to opposite short sides of the rectangular flat-plate insulating sheet 110, and are connected via the linear common electrodes 220 and 240 to the individual terminals 210 and 230, respectively. Thus, the interdigital pair-electrode capacitor 200 is formed.

In the flat-plate capacitive strain sensor 100 using the above-mentioned interdigital pair-electrode capacitor 200, let the rectangular flat-plate insulating sheet 110 be bent in a direction perpendicular to the extending direction of the linear electrodes 250 and 260. In this event, the mutual spacing between adjacent ones of the linear electrodes 250 and 260 is varied. Specifically, in case where the electrode surface is deformed in an expanding shape, a tensile strain is produced in the dielectric film layer 120 to widen the mutual spacing. In case where the electrode surface is deformed in a depressed shape, a compressive strain is produced in the dielectric film layer 120 to narrow the mutual spacing. Accordingly, the value of the capacitance between the terminals 210 and 230 is changed.

Next, referring to actual measured values shown in FIG. 8 in addition to FIG. 7, description will be made about the change in value of the capacitance which is produced when the flat plate capacitive strain sensor 100 illustrated in FIG. 6 is deformed by the use of a pressing device.

Herein, the rectangular flat plate insulating sheet 110 is made of zirconia ceramics which is relatively excellent in flexibility. The dielectric film layer 120 formed on the surface thereof is made of a lead-based material which is typically used in a ceramic capacitor and has a high dielectric constant.

Figure 7:
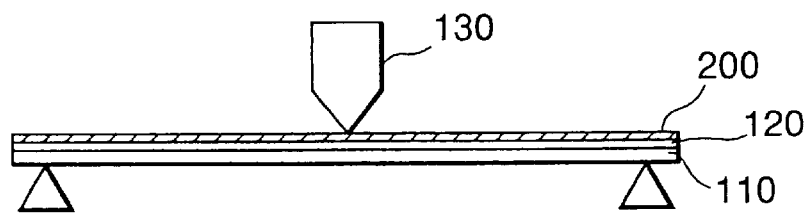
FIG. 7 is a side view schematically showing a part for pressing the flat-plate capacitive strain sensor shown in FIG. 6.

As illustrated in FIG. 7, the rectangular flat plate insulating sheet 110 with the dielectric film layer 120 and the interdigital pair-electrode capacitor 200 formed on the surface thereof is cut into a piece having suitable length. While it is supported at both end portions of the long sides, it is pressed at its center in a direction parallel to the short sides by the use of a knife-edged pressing plate, and the pressing force (g)—capacitance change rate (%) characteristic is measured. The result is shown in FIG. 8. It is noted here that the characteristic plotted with □ marks in FIG. 8 shows the measured values in case where the back side of the electrode surface is pressed, while the characteristic plotted with Δ marks shows the measured values in case where the top side of the electrode surface is pressed.

Figure 8:
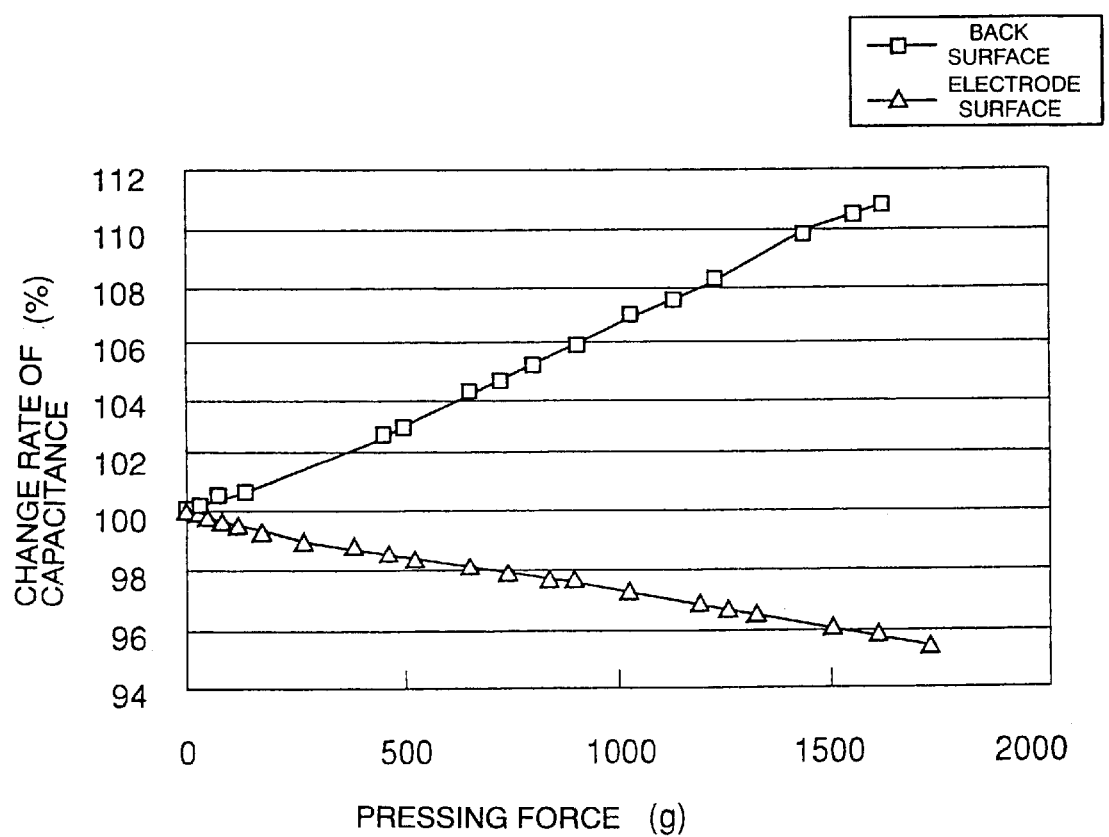
FIG. 8 is a characteristic chart showing the result of measurement of a pressing force-capacitance change rate characteristic in the flat-plate capacitive strain sensor while it is pressed in the manner illustrated in FIG. 7.

As seen from FIG. 8, in case of the characteristic of the □ marks obtained by pressing the back side of the electrode surface, the value of the capacitance is increased with the increase of the pressing force, although the deformation is such that the mutual spacing of the electrodes is increased. On the other hand, in case of the characteristic of the Δ marks obtained by pressing the top side of the electrode surface, the value of the capacitance is decreased with the increase of the pressing force, although the deformation is such that the mutual spacing of electrodes is decreased. Thus, it is understood that the sensor has a so-called "positive strain—dielectric constant characteristic" in which the dielectric constant is increased in the direction of the strain applied to the dielectric film layer 120.

Accordingly, in case where the dielectric film layer 120 in FIG. 6 is made of a material having a great "strain—dielectric constant characteristic", the change in capacitance between the terminals 210 and 230 as the capacitor is greater than the change in capacitance simply depending on the change in mutual spacing of the electrodes.

On the other hand, if the rectangular flat plate insulating sheet 110 is bent in a direction same as the extending direction of the linear electrodes 250 and 260, the linear electrodes 250 and 260 exhibit very slight variation in length. However, the mutual spacing between adjacent ones of the linear electrodes 250 and 260 is not substantially changed so that the value of capacitance between the terminals 210 and 230 is not substantially changed.

This means that the interdigital electrode pattern shown in the figure serves as a strain sensor excellent in sensitivity with respect to the deformation in an axial direction perpendicular to the linear electrodes extending in parallel but the sensitivity is significantly reduced with respect to the deformation in another axial direction perpendicular to the above-mentioned direction, that is, in a direction parallel to the linear electrodes.

Accordingly, in the strain sensor, it is more effective to form the interdigital pair-electrode having a shape matching a strain distribution on the surface of an elastic body so that the strain sensor can efficiently detect the deformation strain on the surface of the elastic body which is deformed in a state with its periphery fixed.

Figure 1:
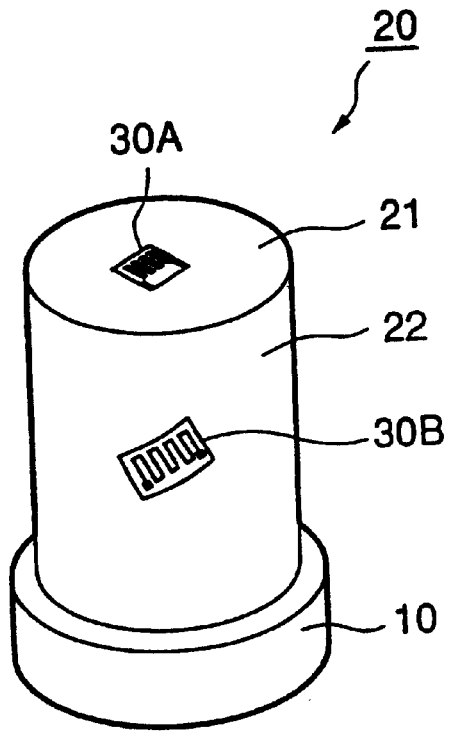
FIG. 1 is a perspective view showing an example of the state of use of a conventional strain sensor.
Figure 2:
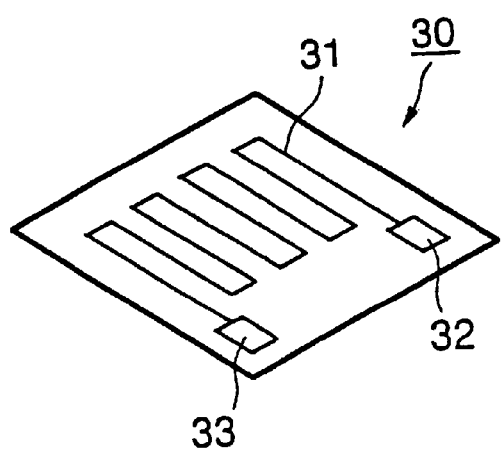
FIG. 2 is a perspective view showing an example of a strain gauge used as the conventional strain sensor.
Figure 3:
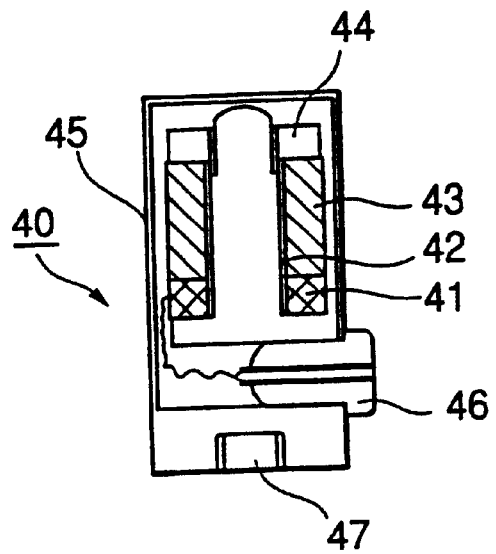
FIG. 3 is a sectional view showing a structure of a conventional piezoelectric type acceleration sensor.
Figure 4:
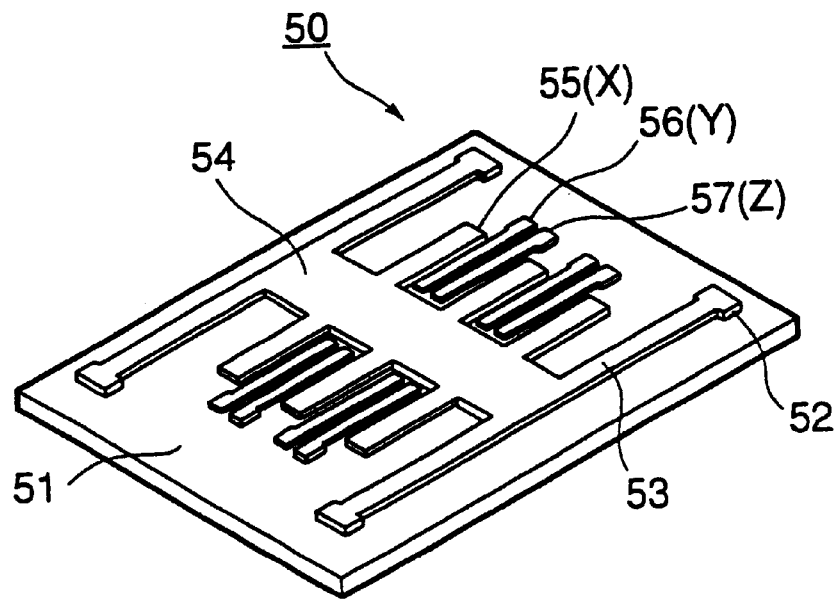
FIG. 4 is a schematic perspective view of a structure of a capacitive acceleration sensor using a micromachining technique.
Figure 5:
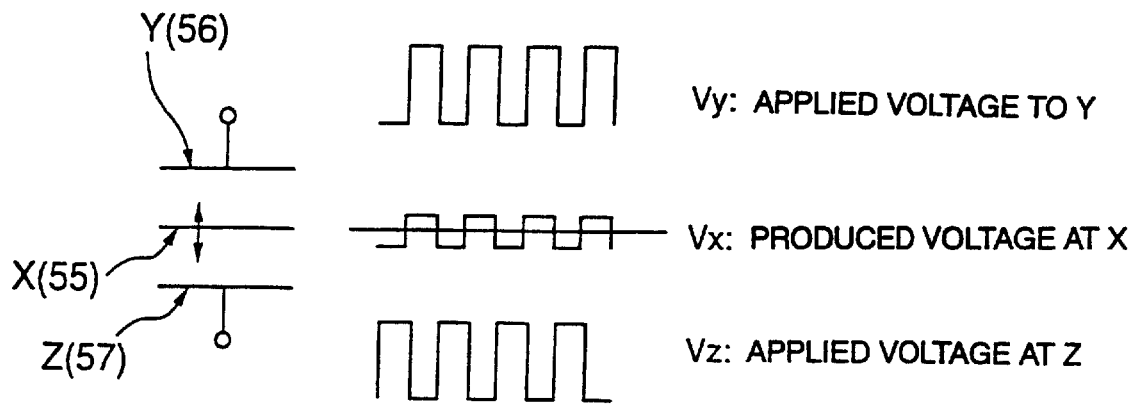
FIG. 5 is a view for illustrating an operation of the capacitive acceleration sensor shown in FIG. 4.

Now referring to FIGS. 9(A), 9(B), 10(A), and 10(B), consideration will be made about a strain sensor formed in the center area of the upper end 21 of the elastic body 20 which is the hollow cylindrical closed container as illustrated in FIG. 1.

The upper end 21 of the hollow cylindrical closed container elastic body 20 exhibits a strain distribution such that the strain is maximum in the center area thereof, and that the strain is caused in a radial direction and has a magnitude represented by substantially concentric contour lines. Therefore, in order to efficiently detect as the change in capacitance the deformation having the above-mentioned strain distribution, the interdigital pair-electrode capacitor 200 shown in FIG. 6 is preferably rounded into an annular shape to form a circular-shaped interdigital pair-electrode capacitor 201 as illustrated in FIGS. 9(A), 9(B), 10(A), and 10(B) or into a circular shape having rounded corners in which the corners of the square are rounded.

Figure 9:
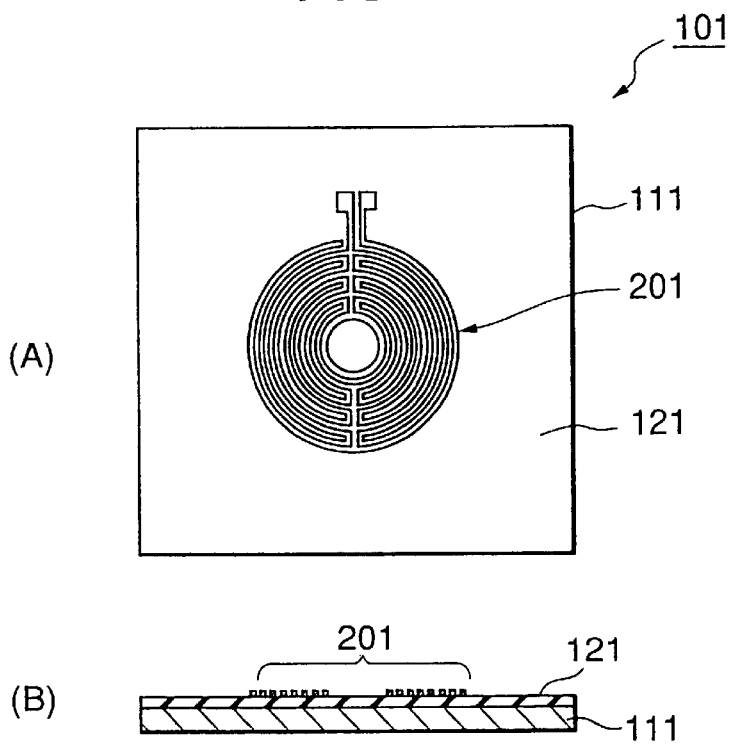
FIG. 9(A) is a plan view showing a structure of a capacitive strain sensor according to an embodiment of this invention.
FIG. 9(B) is a sectional view in a thickness direction of the sensor shown in FIG. 9(A)
Figure 10:
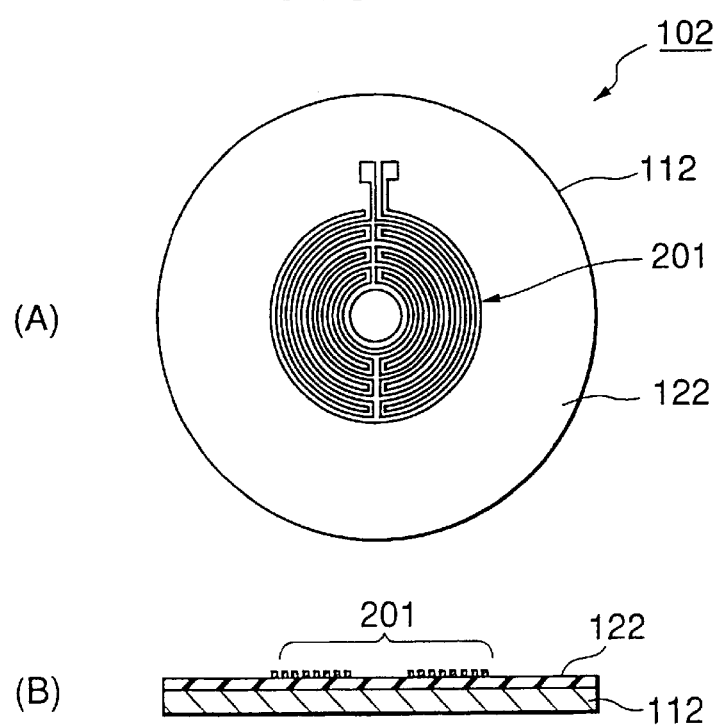
FIG. 10(A) is a plan view showing a structure of a capacitive strain sensor according to another embodiment different from FIG. 9(A)
FIG. 10(B) is a sectional view in a thickness direction of the sensor shown in FIG. 10(A)

Referring to FIGS. 9(A) and 9(B), in a flat plate capacitive strain sensor 101, a square-shaped flat plate insulating sheet 111 is provided with a dielectric film layer 121. Referring to FIGS. 10(A) and 10(B), in a flat plate capacitive strain sensor 102, a circular-shaped flat plate insulating sheet 112 is provided with a dielectric film layer 122. On the surface of each dielectric film layer, a circular-shaped interdigital pair-electrode capacitor 201 of a same shape is formed.

With this structure, in case where an external force acts on the upper end surface 21 in FIG. 1 so that the flat-plate insulating sheet 112 formed thereon is deformed, the spacing between adjacent ones of the linear electrodes is changed so that the capacitance of the interdigital pair-electrode capacitor 201 is changed. Therefore, in the circular-shaped interdigital pair-electrode capacitor 201, it is possible to efficiently detect the deformation of the flat plate insulating sheet 112 formed on the upper end surface 21 of the closed container elastic body 20 as a result of the change in pressure within the cylindrical closed container.

In case where the upper flat end 21 has a circular shape as illustrated in FIG. 1, the flat plate insulating sheet 112 having a complete circular shape illustrated in FIGS. 10(A) and 10(B) is suitable so as to efficiently detect the deformation of the upper end 21.

Next, referring to FIGS. 11(A) and 11(B), description will be made about a strain sensor for appropriately detecting cylinder torsion produced on an outer peripheral surface of the bar-like cylindrical elastic body 20 illustrated in FIG. 1.

One interdigital pair-electrode capacitor 203 forming a pair of electrode patterns comprises common electrodes 213 and 223 which are connected to a pair of terminals (not shown in the figure) of the capacitor and each of which is arranged to extend in parallel with and along opposite long sides of a rectangular insulating sheet 113. However, when the cylindrical elastic body 20 is applied with a torsional moment so that torsional strain is produced in the cylindrical elastic body 20, a tensile strain in a direction inclined by 45° with respect to an axial direction of the cylindrical elastic body 20 and a compressive strain in a direction perpendicular to the above-mentioned direction are produced at a portion where the strain sensor is adhered, as described above. Therefore, a plurality of linear electrodes 233 extending from the common electrode 213 and another plurality of linear electrodes 243 extending from the linear common electrode 223 extend in a direction approximately 45° with respect to the extending direction of the common electrodes 213 and 223 and are arranged to be alternately interposed in parallel to one another. Thus, one capacitor is formed.

Figure 11:
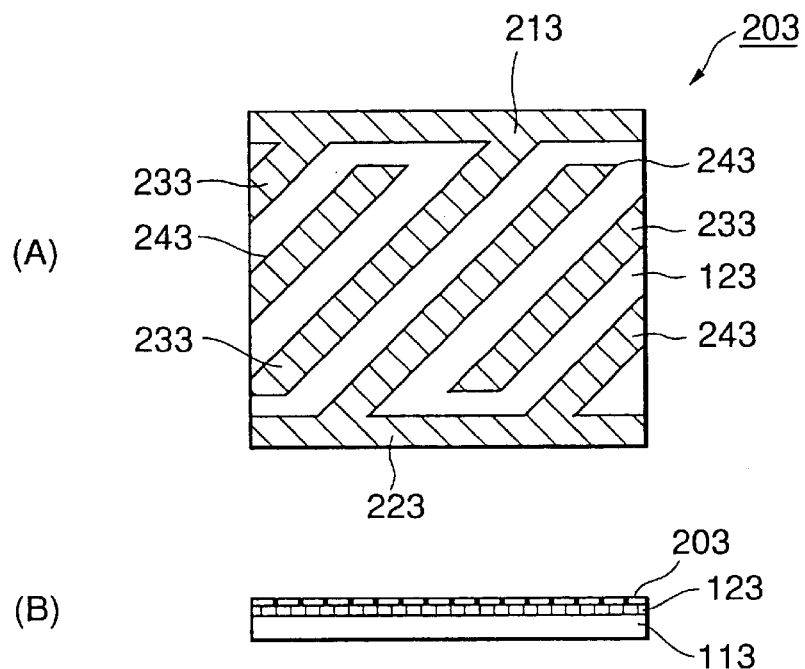
FIG. 11(A) is a plan view showing a basic pattern of an interdigital pair-electrode capacitor used in a capacitive torsional strain sensor according to an embodiment of this invention.
FIG. 11(B) is a sectional view in a thickness direction of the sensor shown in FIG. 11(A)

Next, referring to FIG. 12, description will be made in detail about the case where the interdigital pair-electrode capacitor 203 illustrated in FIG. 11 is used as a cylindrical capacitive torsional strain sensor 104.

Figure 12:
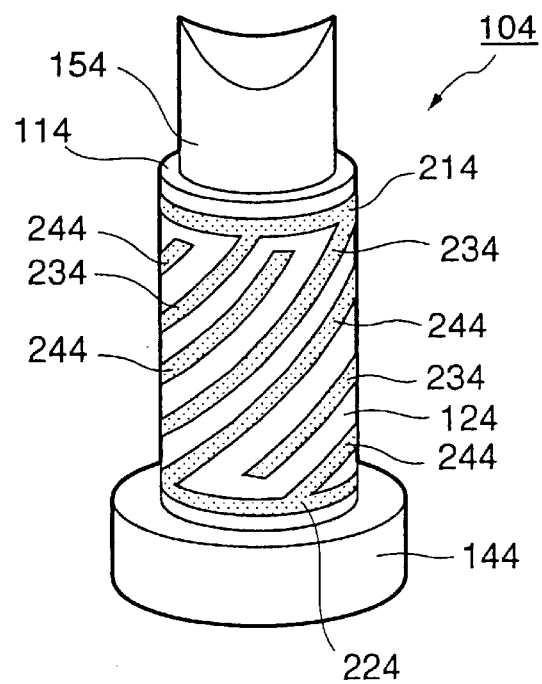
FIG. 12 is a perspective view showing a basic pattern of an interdigital pair-electrode capacitor used in a cylindrical capacitive torsional strain sensor according to an embodiment of this invention.

FIG. 12 is a perspective view showing a basic structure of one torsional strain sensor 104 according to this invention.

The torsional strain sensor 104 shown in the figure is formed on an outer peripheral surface of an insulator bar 154. The insulator bar 154 is an object structure to be detected, which has one end fixed to a mount table 144, which extends therefrom with its center axis coincident with the center axis direction of the mount table 144, and which has a circular section across the outer peripheral surface. The material thereof is insulator plastics (or ceramics).

Specifically, in the torsional strain sensor 104, a dielectric film layer 114 having a dielectric constant changing in dependence on the strain is formed on the outer peripheral surface of the insulator bar 154 to be substantially uniform in thickness, as a thick film or a thin film as a substrate of the torsional strain sensor 104. On the outer peripheral surface of the dielectric film layer 114, a pair of electrode patterns are formed by a pair of ring-shaped common electrodes 214 and 224 and a plurality of linear electrodes 234 and 244 in a spiral pattern to hold the capacitance. In addition, the pair of ring-shaped common electrodes 214 and 224 are arranged near two opposite sides parallel to each other, that is, along peripheral edges, respectively.

The above-mentioned electrode patterns are characterized in that the plurality of linear electrodes 234 and 244 in a spiral pattern spirally extend from the pair of ring-shaped common electrodes 214 and 224 in parallel to one another to be inclined by about 45° with respect to the center axis direction, that is, with respect to an extending direction of the common electrodes 214 and 224 and to be alternately interposed.

The common electrodes 214 and 224 are connected to terminals (not shown in the figure) for a capacitor. The pair of electrode patterns formed by the common electrode 214 and the linear electrodes 234 and by the other common electrode 224 and the other linear electrodes 244 act as the capacitor having the capacitance.

In the above-mentioned cylindrical capacitive torsional strain sensor 104, the strain sensor 104 can be arranged directly on the insulator bar 154 to provide a structure having no adhesive layer. Therefore, it is possible to easily obtain a simple structure and the change in capacitance having a stable characteristic.

In the meanwhile, the torsional strain can be decomposed into a tensile strain and a compressive strain in directions of +45° and −45° with respect to a torsional axis direction, respectively. Accordingly, in case of the cylindrical capacitive torsional strain sensor 104 described with reference to FIG. 12, the dielectric constant is varied in a direction in which the spiral linear electrodes 234 and 244 are faced to each other, depending on whether the torsional strain is positive or negative (direction of the torsion), so that the value of the capacitance between the terminals of the capacitor is varied. From this variation, it is possible to detect the magnitude of the produced torsional strain.

Furthermore, as described with reference to FIG. 8, the magnitude of the strain differs depending upon the direction of the strain. Therefore, it is possible to additionally provide with another strain sensor capable of detecting the strain in a reverse direction and to thereby detect by both sensors tensile strains increased in opposite directions, which are added together to thereby enable to more effectively improve the sensitivity.

Next, referring to FIGS. 13 and 14, description will be made about a cylindrical capacitive torsional strain sensor comprising two sets of pairs of linear electrodes in a spiral pattern for detecting the strain in reverse directions as mentioned above.

Figure 13:
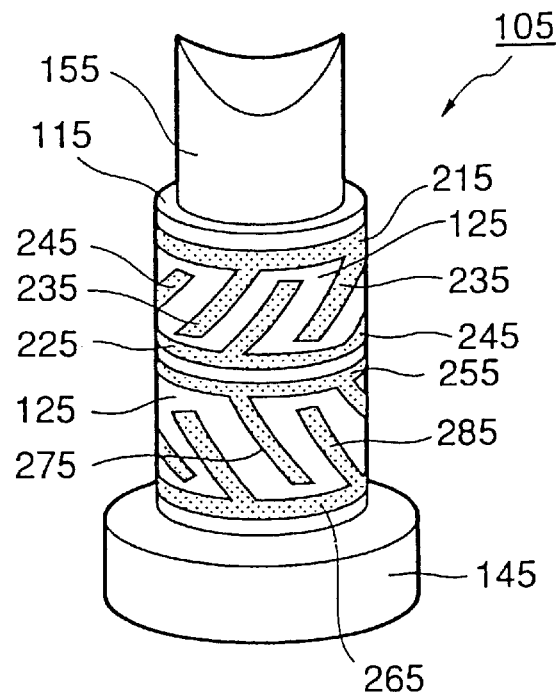
FIG. 13 is a perspective view showing an example using two interdigital pair-electrode capacitors similar to that shown in FIG. 12.

A torsional strain sensor 105 illustrated in FIG. 13 is formed on an outer peripheral surface of an insulator bar 155, like in FIG. 12. The insulator bar 155 has one end fixed to a mount table 145, extends therefrom with its center axis coincident with the center axis direction of the mount table 145, and has a circular section across the outer peripheral surface. In the torsional strain sensor 105, a dielectric film layer 115 having dielectric constant changing in dependence on the strain is formed on the outer peripheral surface of the insulator bar 155 as a thick film or a thin film to be a substrate substantially uniform in thickness.

As a difference from FIG. 12, one interdigital pair-electrode capacitor of the torsional strain sensor 105 is divided on the outer peripheral surface of the dielectric film layer 115 into two equal parts by a plane perpendicular to the center axis direction so that a pair of common electrodes 215 and 225 and another pair of common electrodes 255 and 265, that is, two sets of ring-shaped common electrodes having a distance substantially equal to ½ of that shown in FIG. 12 are arranged on a dielectric film layer 125. A first set of pair of linear electrodes 235 and 245 are inclined by about +45° with respect to the extending direction of the above-mentioned common electrodes 215 and 225 to form a first interdigital pair-electrode while a second set of pair of linear electrodes 275 and 285 are inclined by about −45° with respect to the extending direction of the above-mentioned common electrodes 255 and 265 to form a second interdigital pair-electrode capacitor.

As described above, the capacitors are formed by the two sets of the spiral linear electrodes perpendicular to each other and forming a pair of electrode patterns. Therefore, it is possible to detect an equivalent strain level with respect to an equivalent torsion in a reverse direction.

Figure 14:
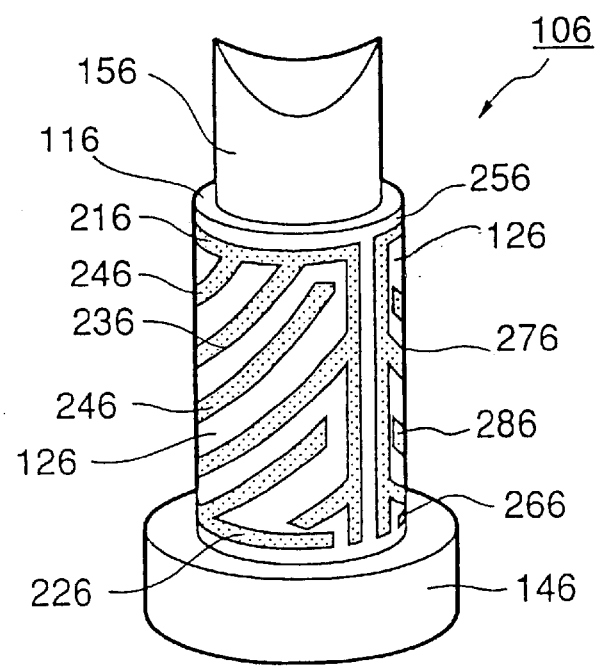
FIG. 14 is a perspective view showing another example using two interdigital pair-electrode capacitors similar to that illustrated in FIG. 12 but different from those illustrated in FIG. 13.

Next, a torsional strain sensor 106 illustrated in FIG. 14 is formed on an outer peripheral surface of an insulator bar 156, like in FIG. 12. The insulator bar 156 has one end fixed to a mount table 146, extends therefrom with its center axis coincident with the center axis direction of the mount table 146, and has a circular section across the outer peripheral surface. In the torsional strain sensor 106, a dielectric film layer 116 having an dielectric constant changing in dependence on the strain is formed on the outer peripheral surface of the insulator bar 156 as a thick film or a thin film to serve as a substrate substantially uniform in thickness.

As a difference from FIG. 12, one interdigital pair-electrode capacitor of the torsional strain sensor 106 is divided with respect to the outer peripheral surface of the dielectric film layer 116 into two equal parts by split lines parallel to the center axis direction so as to include a pair of common electrodes 216 and 226 and another pair of common electrodes 256 and 266, that is, two sets of pair of half-ring common electrodes arranged on the common ring-shaped lines and located near two opposite sides. Specifically, one electrode pattern is formed by a plurality of linear electrodes 236 and 246 spirally extending from the pair of common electrodes 216 and 226 in parallel to one another to be alternately interposed and inclined by about +45° with respect to the center axis direction while the other electrode pattern is formed by a plurality of linear electrodes 276 and 286 spirally extending from the pair of common electrodes 256 and 266 in parallel to one another to be alternately interposed and inclined by about −45° with respect to the center axis direction. The capacitance is formed by each pair of the electrode patterns.

With the above-mentioned structure, it is possible to increase the detection sensitivity to almost two times by obtaining the difference in detection output between the two capacitances. In addition, it is possible to cancel an undesired signal (for example, a component such as characteristic fluctuation depending on the change in ambient temperature) generated in these strain sensors in common.

On the other hand, the capacitive strain sensor described with reference to FIG. 8 and using a material having a great "strain—dielectric constant characteristic" has a simple structure and can readily form an LC oscillator circuit or an RC oscillator circuit to carry out frequency conversion so that a very small strain level can precisely be detected. Therefore, the above-mentioned sensor is very effective in practical use.

Figure 15:
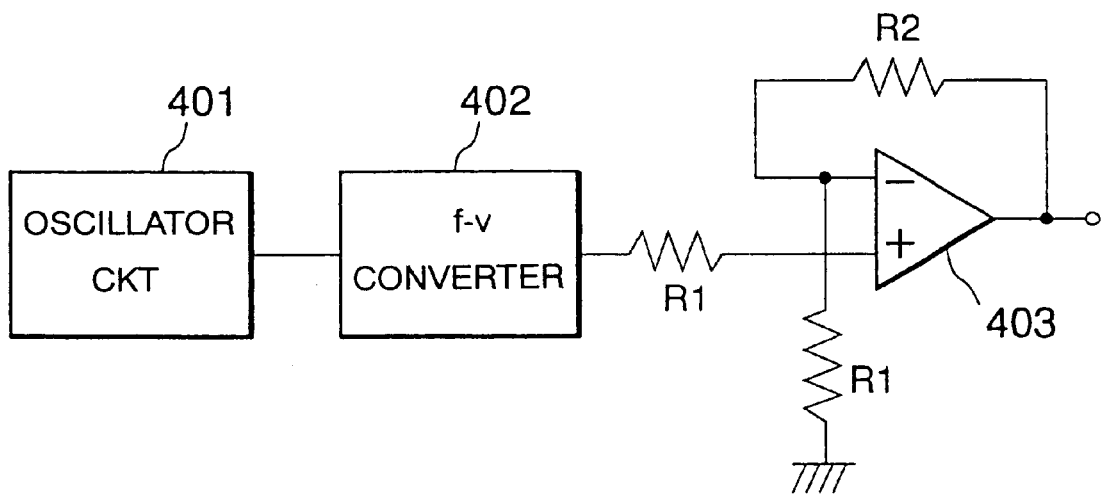
FIG. 15 is a circuit diagram showing an oscillator circuit including the capacitive strain sensor for detecting a strain level according to an embodiment.

Next, referring to FIG. 15, description will be made about one circuit structure using an oscillator circuit and an operational amplifier in order to detect a strain level.

In the circuits illustrated in the figure, an output of an oscillator circuit 401 is connected to one input of an operational amplifier 403 via an f-v (frequency-voltage) converter 402 and a resistance value R1. On the other hand, the ground and the feedback of an output of the operational amplifier 403 are connected to the other input of the operational amplifier 403 via the resistance value R1 and a resistance value R2, respectively.

The oscillator circuit 401 shown in the figure has the above-mentioned interdigital pair-electrode capacitor of the capacitive strain sensor with the capacitance thereof incorporated into the LC circuit or the RC circuit. Accordingly, when the capacitance is varied due to the generation of the strain, an output frequency of the oscillator circuit 401 is changed. The change in frequency is converted into a voltage by the f-v converter 402. Through the operational amplifier 403, a very small strain level can be accurately detected.

The capacitive strain sensor has a simple structure and can readily form the LC oscillator circuit or the RC oscillator circuit so that it is very effective in practical use. However, since the dielectric film layer is used, the capacitance varies also by the change in ambient temperature. Therefore, it is necessary to correct the capacitance change depending on the temperature.

Next, referring to FIGS. 16 through 18, description will be made about a capacitive strain sensor capable of carrying out temperature compensation.

Figure 16:
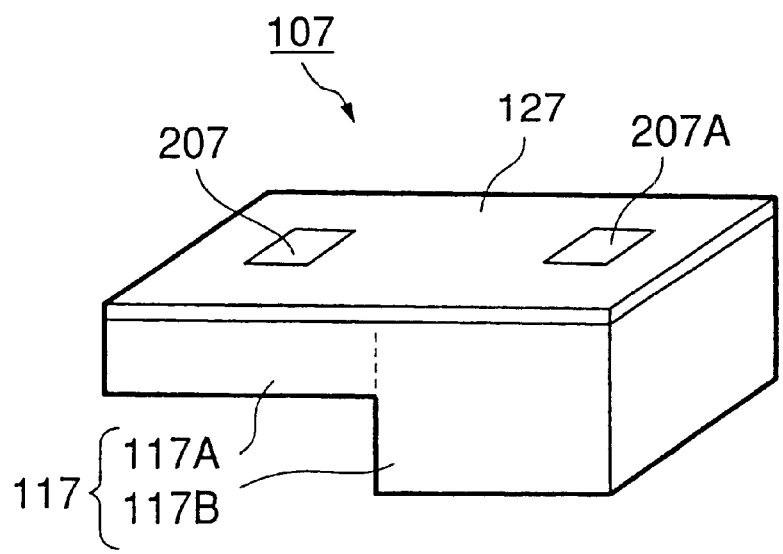
FIG. 16 is a perspective view showing a capacitive strain sensor according to an embodiment of this invention which is capable of carrying out temperature correction.

FIG. 16 is a perspective view showing a capacitive strain sensor 107 according to an embodiment of this invention. The capacitive strain sensor 107 shown in the figure comprises a ceramics substrate 117 having sections different in thickness and a dielectric layer 127 made of a material having a dielectric constant changing in dependence upon the strain and formed on a flat plane of the ceramic substrate. Herein, when the ceramic substrate 117 is subjected to an external pressure, a thin portion of the substrate 117A suffers large strain. On the other hand, a thick portion of the substrate 117B is free from strain even if it is subjected to a large external pressure.

The capacitive strain sensor 107 comprises two interdigital pair-electrode capacitors 207 and 207A having the same shape. The one interdigital pair-electrode capacitor 207 is formed on the surface of the substrate 117A while the other interdigital pair-electrode capacitor 207A is formed on the surface of the substrate 117B. The interdigital pair-electrode capacitor 207A formed on the thick portion of the substrate 117B forms a reference capacitor for temperature compensation.

The interdigital pair-electrode capacitor 207A which serves as the reference capacitor has a temperature characteristic similar to that of the interdigital pair-electrode capacitor 207 of the capacitive strain sensor 107 which serves to detect the strain. The variation in capacitance of the interdigital pair-electrode capacitor 207 with respect to the change in ambient temperature is corrected by the use of the variation in capacitance of the interdigital pair-electrode capacitor 207A as the reference capacitor so as to obtain the variation in capacitance with respect to the change in strain under the external force.

For instance, referring to FIG. 17, description will be made about a first example of correction.

Figure 17:
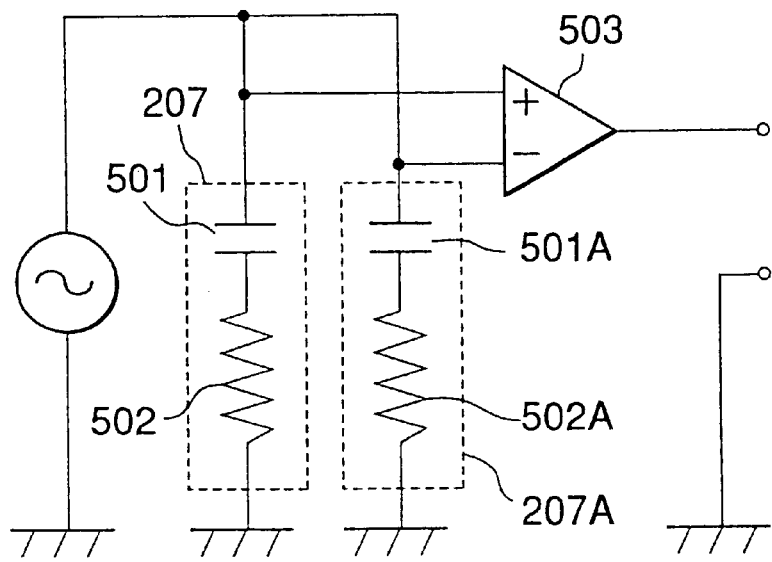
FIG. 17 is a correction circuit diagram showing an example using the capacitive strain sensor shown in FIG. 16.

FIG. 17 is a circuit diagram for carrying out temperature compensation by the use of an impedance of the interdigital pair-electrode capacitor 207 in the capacitive strain sensor 107 illustrated in FIG. 16 and by the use of an impedance of the interdigital pair-electrode capacitor 207A as the reference capacitor. In FIG. 17, a capacitor 501 and a resistor 502 represent the capacitance and an internal resistance of the interdigital pair-electrode capacitor 207, respectively, while a capacitor 501A and a resistor 502A represent the capacitance and an internal resistance of the interdigital pair-electrode capacitor 207A, respectively. The interdigital pair-electrode capacitors 207 and 207A are substantially equivalent in temperature characteristic of the capacitance and internal resistance. Accordingly, respective impedances are extracted as voltage values from output terminals to derive the difference therebetween by the use of a comparator 503 so that the temperature compensation is carried out.

Next, description will be made about a second example of correction with reference to FIG. 18.

Figure 18:
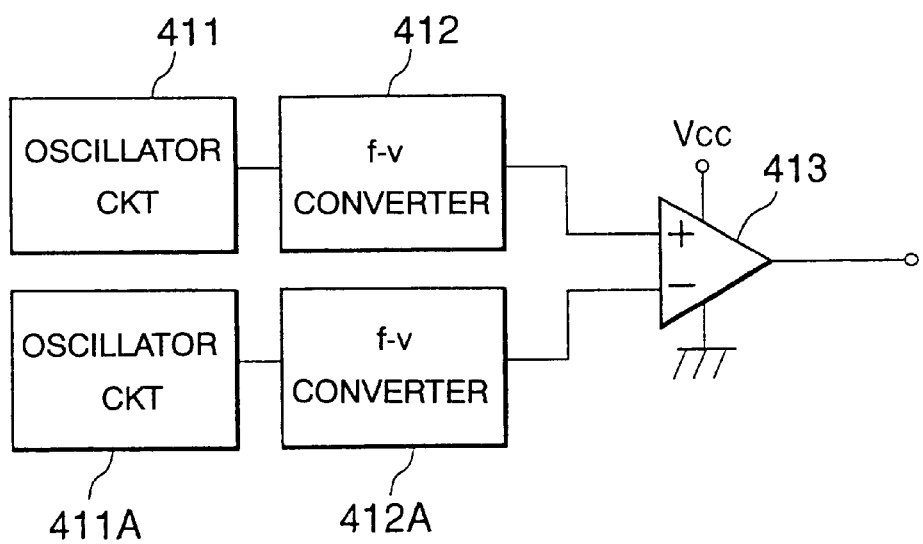
FIG. 18 is a correction circuit diagram showing an example using another capacitive strain sensor different from that illustrated in FIG. 17 in an oscillator circuit.

FIG. 18 is a block diagram for carrying out temperature compensation. Specifically, oscillator circuits equivalent in structure are formed to include LC circuits or RC circuits each incorporating the capacitance of an interdigital pair-electrode capacitor in a capacitive strain sensor. The oscillation frequency of one of the oscillators including the interdigital electrode capacitors is subjected to temperature compensation by the use of the oscillation frequency of the other as the reference.

In FIG. 18, each of the oscillator circuits 411 and 411A is formed by provision of the LC circuit or the RC circuit using each of the two interdigital pair-electrode capacitors (for example, 207 and 207A) equivalent in structure in the capacitive strain sensor. The interdigital pair-electrode capacitor (207A) used in the one oscillator circuit 411A serves as the above-mentioned reference capacitor. Since the output frequency is changed when the capacitance is varied, outputs of the oscillator circuits 411 and 411A are converted into electric voltages by f-v converters 412 and 412A, respectively. By making the difference therebetween by the use of a comparator 413, the temperature compensation is carried out.

In the foregoing description, the dielectric film layer is described as the dielectric thick film having the high dielectric constant used in a ceramic capacitor or the like. However, in case where the capacitance of the reference capacitor is formed so that a dielectric material, a film thickness, and the size of the interdigital electrode are substantially equal to those of the interdigital pair-electrode capacitor for detecting the strain, these capacitors need not be formed on a common body surface but may be arranged at different positions under such a condition that the interdigital pair-electrode capacitor for detecting the strain and the reference capacitor are assumed to be within a same temperature environment. Since the dielectric is significantly affected by the temperature, description has been made exclusively for the temperature compensation. However, compensation is also possible for other environmental factors such as the humidity.

Next, referring to FIGS. 19 and 20, description will be made about an acceleration sensor which uses an interdigital pair-electrode capacitor having the shape illustrated in FIG. 6 as a capacitive strain sensor, which has an advantage of the acceleration sensor capable of detecting an acceleration on a d.c. basis, and which is capable of detecting the change in capacitance due to deformation of an elastic body subjected to acceleration, by a single element without using electrodes, such as a fixed electrode and a movable electrode.

Figure 19:
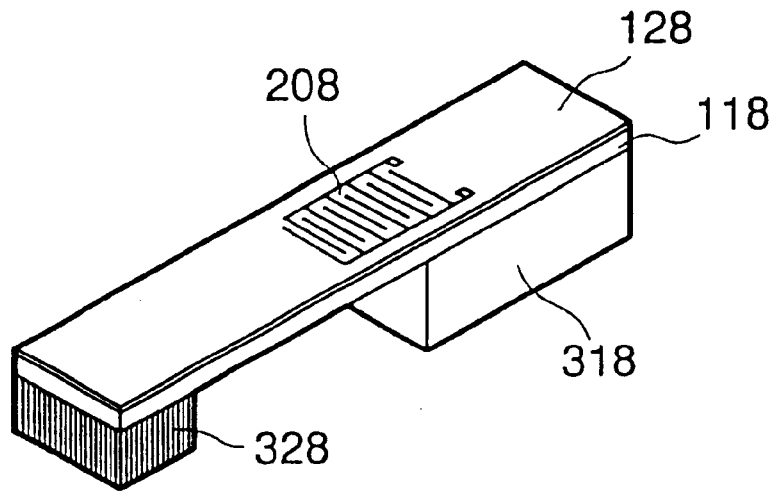
FIG. 19 is a perspective view showing an example using a capacitive strain sensor as an acceleration sensor according to of this invention.

FIG. 19 is a perspective view showing an acceleration sensor according to an embodiment of this invention. The acceleration sensor shown in the figure comprises a zirconia substrate 118, a ferroelectric thick film layer 128 having dielectric constant changing in dependence on strain and being formed on the surface of the substrate with a substantially uniform thickness, and one interdigital pair-electrode capacitor 208 formed as a capacitance element at an approximate center of the thick film 128. The interdigital pair-electrode capacitor 208 comprises linear electrodes extending in a direction perpendicular to a direction of the strain produced by the acceleration to be detected and a pair of common electrodes connected to two terminals for input and output.

The zirconia substrate 118 has one end fixed by a supporting/fixing block 318 and the other end to which a weight 328 is fixed. In the acceleration sensor illustrated in FIG. 19, it is assumed that an acceleration $\alpha_8$ is applied in a direction perpendicular to a flat plane of the zirconia substrate 118. In this event, the force "$F_8=M_8\alpha_8$" acts on the weight 328 so that the zirconia substrate 118 is deformed and bent under the force $F_8$. As a result, in the interdigital pair-electrode capacitor 208 as one capacitance element, the value of the capacitance between two terminals is changed. Since the capacitance is changed in proportion to the applied force, that is, the applied acceleration as illustrated in FIG. 8, it is possible to detect the applied acceleration from the change in capacitance.

Figure 20:
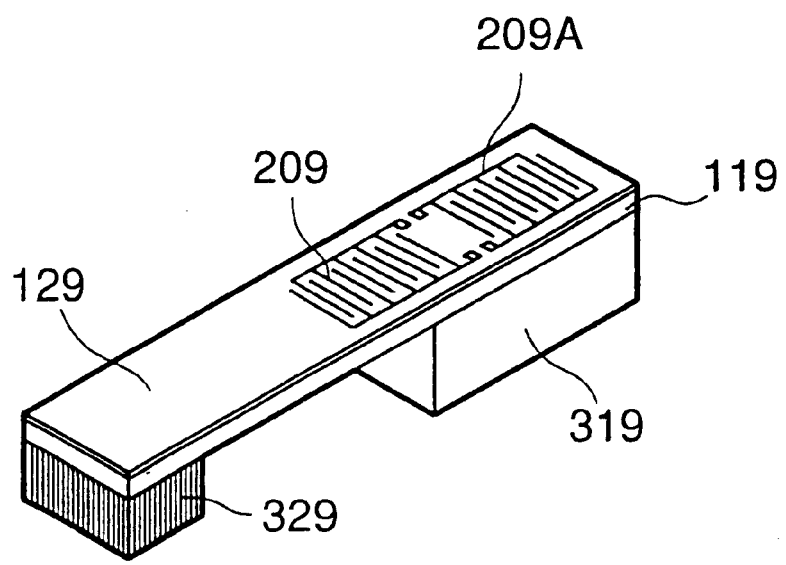
FIG. 20 is a perspective view showing another example using capacitive strain sensors according to this invention as an acceleration sensor different from that shown in FIG. 19.

FIG. 20 is a perpendicular view showing an acceleration sensor according to another embodiment of this invention.

The acceleration sensor shown in the figure comprises a zirconia substrate 119, a ferroelectric thick film layer 129 having a dielectric constant changing in dependence on strain and being formed on the surface of the substrate with a substantially uniform, and a first interdigital pair-electrode capacitor 209 formed as a capacitance element at an approximately center of the thick film 129. The first interdigital pair-electrode capacitor 209 is formed by an interdigital pair-electrode in which the linear electrodes extend in a direction perpendicular to a direction of the strain produced by the acceleration to be detected. Two terminals of the first interdigital pair-electrode capacitor 209 are led out for input and output from the respective linear electrodes via common electrodes. The zirconia substrate 119 has one end fixed to a supporting/fixing block 319 and the other end to which a weight 329 is fixed.

The foregoing structure is similar to that of the FIG. 19 described above. The difference from FIG. 19 is that a second interdigital pair-electrode capacitor 209A comprising linear electrodes equal in shape and size to the first interdigital pair-electrode capacitor 209 is formed as the capacitance element at a portion where the zirconia substrate 119 is fixed and adhered to the supporting/fixing block 319 and that the two terminals for input and output of the capacitance element are led out from the respective linear electrodes via the common electrodes.

In the acceleration sensor illustrated in FIG. 20, when an acceleration $\alpha_9$ is applied in a direction perpendicular to the flat plane of the zirconia substrate 119, the force "$F_9\alpha_9=M_9$" acts on the weight 329 so that the zirconia substrate 119 is deformed and bent under the force $F_9$, like in case of FIG. 19. As a result, the value of the capacitance across the two terminals led out from the first interdigital pair-electrode capacitor 209 is changed. On the other hand, the portion where the second interdigital pair-electrode capacitor 209A is formed is hardly deformed under the force $F_9$ generated by the applied acceleration because the zirconia substrate 119 is fixed and adhered to the supporting/fixing block 319. Accordingly, the value of the capacitance across the two terminals led out from the second interdigital pair-electrode capacitor 209A is not substantially changed in response to the applied acceleration.

In the acceleration sensor illustrated in FIG. 20, these interdigital pair-electrode capacitors 209 and 209A are formed on the ferroelectric thick film of the same material to be close to each other and are substantially identical in shape and size with each other. Accordingly, the capacitances of the respective interdigital pair-electrode capacitors are similarly affected by environmental conditions, such as the change in ambient temperature and electromagnetic noise, other than the acceleration. By using a differential amplifier circuit which is typically used in such event, it is possible to cancel the above-mentioned disturbance conditions, as described with reference to FIGS. 16 through 18. Specifically, the capacitance obtained by the second interdigital pair-electrode capacitor additionally provided as one capacitance element can be used as the reference for detection of the acceleration.

In the foregoing, description has been made about the case where the common electrode of the interdigital pair-electrode capacitor has a linear shape. However, as far as the common electrode is made of a conductive material having flexibility corresponding to the strain to be detected, the shape is not limited to the linear shape but may be a narrow plate shape, a thin plate shape, a narrow and thin plate shape.

In the foregoing description, the elastic body having a surface on which the strain sensor is formed has been described with reference to an example of a closed container having the top and the bottom surfaces which have a square shape or a circular shape. In order to efficiently detect the deformation, it is preferable to take the shape of a circle or a regular polygon including a square, i.e., the shape so that a substrate of the strain sensor can have a center point. Although the closed container has been mentioned as a cylindrical shape, this invention is applicable to any other shape as far as the shape has a plate member portion which is deformed in response to an internal pressure.

Description has been made about the case where insulator ceramics is used as a material of the elastic body. In case where the elastic body has conductivity, the dielectric film layer is formed via an insulation layer having a low dielectric constant so that the capacitive strain sensor can readily be obtained with the same effect.

The zirconia substrate is used as the insulator substrate and the ferroelectric layer is formed as a thick film. Alternatively, the insulator substrate may comprise a glass substrate or a Si single crystal substrate with $SiO_2$ film formed thereon and a ferroelectric thin film layer may be formed by sputtering or the like on the surface of the substrate.

In the foregoing, description has been made about the case where the acceleration sensor has a so-called cantilevered structure having one end as a fixed end, with the weight added to the distal end. Alternatively, the similar effect can be obtained with the structure in which both ends of a rectangular plate is fixed with a weight added at a center area. Furthermore, in case where the substrate having a circular plate shape or a square plate shape is used, the similar effect is obtained by fixing its peripheral portion and adding the weight to the center. Thus, the same effect can be obtained. In particular, in case where the substrate has a circular shape or a square shape, the strain produced when the acceleration is applied in a direction perpendicular to the plate surface is produced in a substantially concentric pattern. Therefore, it is more effective that the interdigital electrode has a concentric pattern corresponding to the strain distribution.

In the embodiment, description has been made about the case where the weight is added. However, depending upon the detection sensitivity and the conditions of the resonant frequency, the mass of the substrate itself may be used as a weight without adding a special weight.

INDUSTRIAL APPLICABILITY

As described above, a capacitive strain sensor according to this invention is formed on the surface of the elastic body and detects the strain accompanying the bending of the elastic body with reference to the change in capacitance. Thus, the capacitive strain sensor is adapted to the use in a field in which the above-mentioned strain is produced. The capacitive strain sensor is incorporated as an element of an oscillator circuit so that the magnitude of the strain due to the deformation of the elastic body can be converted into the change in capacitance and, furthermore, can readily be converted into the change in frequency. Since the converted frequency can finely be extracted, it is possible to easily detect a slight change in strain. Accordingly, the strain sensor according to this invention is also suitable, for example, for detecting an internal pressure of a hollow-cylindrical closed container formed by the elastic body with reference to expansion/depression of a top plane portion, for detecting a cylinder torsion produced on an outer peripheral surface of a bar-like cylindrical elastic body, and as an acceleration sensor for detecting an acceleration.

What is claimed is:

1. A capacitive strain sensor comprising:

a substrate comprising an elastic body having one of a flat surface and a curved surface;

a dielectric film layer formed on the surface of the elastic body with a substantially uniform thickness, said dielectric film layer being made of a material having a dielectric constant which changes in dependence upon strain; and at least one interdigital pair-electrode capacitor formed on the dielectric film layer;

wherein said elastic body comprises a rectangular structure, and wherein said interdigital pair-electrode capacitor comprises a pair of common electrodes extending in parallel to two parallel sides of said rectangular elastic body and faced to each other, and a plurality of linear electrodes inclined by about 45° with respect to an extending direction of said common electrodes and extending in parallel to one another to be alternately interposed as digits of an interdigital pattern.

2. A capacitive strain sensor comprising:

a substrate comprising an elastic body having one of a flat surface and a curved surface;

a dielectric film layer formed on the surface of the elastic body with a substantially uniform thickness, said dielectric film layer being made of a material having a dielectric constant which changes in dependence upon strain; and at least one interdigital pair-electrode capacitor formed on the dielectric film layer;

wherein said elastic body comprises a cylindrical structure which extends in one axis direction as a center axis and which has a circular section across an outer peripheral surface thereof, wherein said dielectric film layer is formed on the outer peripheral surface of said cylindrical structure, and wherein said interdigital pair-electrode capacitor comprises a pair of electrode patterns including a pair of common electrodes forming ring patterns around the outer peripheral surface of said cylindrical structure and faced to each other, and a plurality of linear electrodes inclined by about 45° with respect to the center axis of the cylindrical structure and spirally extending from said common electrodes in parallel to one another to be alternately interposed as digits of an interdigital pattern.

3. A capacitive strain sensor comprising:

a substrate comprising an elastic body having one of a flat surface and a curved surface;

a dielectric film layer formed on the surface of the elastic body with a substantially uniform thickness, said dielectric film layer being made of a material having a dielectric constant which changes in dependence upon strain; and at least one interdigital pair-electrode capacitor formed on the dielectric film layer;

wherein said elastic body comprises a cylindrical structure which extends in one axis direction as a center axis and which has a circular section across an outer peripheral surface thereof, wherein said dielectric film layer is formed on the outer peripheral surface of said cylindrical structure, and wherein said interdigital pair-electrode capacitor comprises at least two sets of electrode patterns arranged coaxially with respect to the center axis of the cylindrical structure, said sets of electrode patterns including: (i) a pair of first electrode patterns including a pair of first common electrodes forming ring patterns around the outer peripheral surface of said cylindrical structure and faced to each other, and a plurality of first linear electrodes inclined by about 45° with respect to the center axis of the cylindrical structure and spirally extending from said common electrodes in parallel to one another to be alternately interposed, and (ii) a pair of second electrode patterns including a pair of second common electrodes forming ring patterns around the outer peripheral surface of said cylindrical structure, and a plurality of second linear electrodes inclined substantially perpendicular to the extending direction of said first linear electrodes and spirally extending from said common electrodes in parallel to one another to be alternately interposed.

4. A capacitive strain sensor comprising:

a substrate comprising an elastic body having one of a flat surface and a curved surface;

a dielectric film layer formed on the surface of the elastic body with a substantially uniform thickness, said dielectric film layer being made of a material having a dielectric constant which changes in dependence upon strain; and at least one interdigital pair-electrode capacitor formed on the dielectric film layer;

wherein said elastic body comprises a cylindrical structure which extends in one axis direction as a center axis and which has a circular section across an outer peripheral surface thereof, wherein said dielectric film layer is formed on the outer peripheral surface of said cylindrical structure, and wherein said interdigital pair-electrode capacitor has two capacitances and comprises two pair of electrode patterns including at least two sets of half-ring common electrodes which are divided by split lines parallel to the center axis of the cylindrical structure and which are arranged on common ring-shaped lines, a plurality of first linear electrodes inclined by about 45° with respect to the center axis of the cylindrical structure and spirally extending from said common electrodes in parallel to one another to be alternately interposed, and a plurality of second linear electrodes inclined substantially perpendicular to said first linear electrodes and spirally extending in parallel to one another to be alternately interposed.

5. A capacitive strain sensor comprising:

a substrate comprising an elastic body having one of a flat surface and a curved surface;

a dielectric film layer formed on the surface of the elastic body with a substantially uniform thickness, said dielectric film layer being made of a material having a dielectric constant which changes in dependence upon strain; and at least one interdigital pair-electrode capacitor formed on the dielectric film layer, said capacitor comprising a pair of electrodes which are formed by a plurality of linear conductors as parallel linear electrodes and which are combined in an interdigital pattern;

wherein said elastic body has a flat plate shape and has one end provided with a fixed portion having a structure for preventing generation of strain, and wherein said interdigital pair-electrode capacitor is formed in an area of said elastic body other than said fixed portion.

6. A capacitive strain sensor as claimed in claim 5, further comprising a weight provided in an area of said elastic body other than said fixed portion of said elastic body to promote bending of said elastic body.

7. A capacitive strain sensor comprising:

a substrate comprising an elastic body having one of a flat surface and a curved surface;

a dielectric film layer formed on the surface of the elastic body with a substantially uniform thickness, said dielectric film layer being made of a material having a dielectric constant which changes in dependence upon strain; and at least one interdigital pair-electrode capacitor formed on the dielectric film layer, said capacitor comprising a pair of electrodes which are formed by a plurality of linear conductors as parallel linear electrodes and which are combined in an interdigital pattern;

wherein said elastic body has a first end provided with a fixed portion having at least one of a thickness which hardly produces strain and a structure which prevents production of strain, and wherein said reference interdigital pair-electrode capacitor is formed on said fixed portion.

8. A capacitive strain sensor as claimed in claim 7, further comprising a weight formed on a second end of said elastic body to promote bending of said elastic body.

9. A capacitive strain sensor comprising:

a substrate comprising an elastic body having one of a flat surface and a curved surface;

a dielectric film layer formed on the surface of the elastic body with a substantially uniform thickness, said dielectric film layer being made of a material having a dielectric constant which changes in dependence upon strain;

at least one interdigital pair-electrode capacitor formed on the dielectric film layer, said capacitor comprising a pair of electrodes which are formed by a plurality of linear conductors as parallel linear electrodes and which are combined in an interdigital pattern; and oscillation means for generating a frequency modulation corresponding to a change in capacitance of said capacitive strain sensor, wherein a strain level is detected as a fluctuation in frequency of an oscillation signal produced by said oscillation means.

10. A capacitive strain sensor comprising:

a substrate comprising an elastic body having one of a flat surface and a curved surface;

a dielectric film layer formed on the surface of the elastic body with a substantially uniform thickness, said dielectric film layer being made of a material having a dielectric constant which changes in dependence upon strain; and a plurality of interdigital pair-electrode capacitors formed on the dielectric film layer, said capacitors each comprising a pair of electrodes which are formed by a plurality of linear conductors as parallel linear electrodes and which are combined in an interdigital pattern;

wherein at least one of said plurality of interdigital pair-electrode capacitors and a different, separately formed capacitor element is selected as a reference capacitor, wherein first and second oscillator circuits are formed by incorporating one of an inductance (L) and a resistance (R) with a capacitance (C) of each of said reference capacitor and remaining ones of said interdigital pair-electrode capacitors, respectively, and wherein a variation between an oscillation frequency output of the first oscillator circuit including said reference capacitor and an oscillation frequency output of the second oscillator circuit including the remaining interdigital pair-electrode capacitors is used for compensating a detected strain.

* * * * *